United States Patent [19]

Lewiner et al.

[11] Patent Number: 5,227,949
[45] Date of Patent: Jul. 13, 1993

[54] DEVICES FOR GROUNDING VEHICLE BODIES OR SIMILAR

[76] Inventors: Jacques Lewiner, 5 Rue Bory d'Arnex, 92210 Saint Cloud; Claude Hennion, 14 Rue de la Glacière, 75013 Paris; Eugeniusz Smycz, 9 A2 Rue Gounod, 92210 Saint Cloud, all of France

[21] Appl. No.: 587,693

[22] Filed: Sep. 25, 1990

[30] Foreign Application Priority Data

Sep. 25, 1989 [FR] France .................. 89 12523

[51] Int. Cl.⁵ ............................ H05F 3/06; H05F 3/02
[52] U.S. Cl. ........................................ 361/212; 361/216
[58] Field of Search ............... 361/212, 213, 216, 217, 361/218, 219

[56] References Cited

U.S. PATENT DOCUMENTS 4,005,357  1/1977  Parkinson ........................ 324/32
4,390,923  6/1983  Saurenman ..................... 361/222

Primary Examiner—Steven L. Stephan
Assistant Examiner—Aditya Krishnan
Attorney, Agent, or Firm—Larson & Taylor

[57] ABSTRACT

A device is provided for grounding a metal vehicle body or the like, comprising an arrangement for automatically creating at desired times, between the body (1) and the ground (3), ions which, under the effect of the electric field which may exist between the body and the ground, are driven towards the body or towards the ground depending on their polarity and thus equalize the potentials of the body and the ground.

10 Claims, 1 Drawing Sheet

DEVICES FOR GROUNDING VEHICLE BODIES OR SIMILAR

The invention relates to devices for grounding metal vehicle bodies or similar assemblies, i.e. generally metal containers which are not intended to remain definitely fixed in a given place, but on the contrary must be adapted to displacements.

It relates more particularly to the case where said containers or bodies—designated by the word "bodies" hereafter for simplification—contain sensitive materials likely to be damaged following defective grounding, because in particular of the existence of a static potential difference between their mass points and ground potential, which may result in the uncontrolled production of electrostatic discharge sparks, or else, because of the instanteous storage of an excessive electric power generated by a high power electromagnetic pulse such as those accompanying lightning or certain explosions.

Such sensitive materials are for example the electronic circuits intended for radioelectric communications, radar detection, seismic measurements, certain explosives, etc..

To ground the bodies considered, it is usual to drive a metal stake into the ground close to the body and to connect this stake to said body by an electrically conducting cable.

This approach assumes that the body is stopped, at least for a time, and that its environment is accessible for the personnel charged with driving in the stake.

This is not possible, if the body, even temporarily immobilized, is located in a hostile environment.

To overcome this drawback and so to make grounding of the body possible without the personnel having to go outside, it has already been proposed to lower from this body a jack carrying a metal foot coming into contact with the ground.

Such an approach may give satisfaction in certain cases.

But it further assumes that the body is stopped and that the metal foot may be placed directly on the conducting ground or on an element capable of establishing a conducting connection with the ground: this is not the case if the foot is placed on an electrically insulating element such as a rock.

The purpose of the invention is especially to overcome the drawbacks of the above approaches by making grounding of the body possible even if, when stopped, it is disposed above an assembly of insulating blocks such as rocks, and even during its displacements.

For this, the grounding devices of the kind in question according to the invention are essentially characterized in that they are adapted to create an immaterial conducting connection between the body to be grounded and the ground itself.

More precisely, these devices comprise means for automatically creating at desired times, between the body and the ground, ions which, under the effect of the electric field which may exist between the body and the ground, are driven towards the body or towards the ground depending on their polarity and thus equalize the potentials of the body and the ground.

In the present text, the word "ions" designates not only positively but also negatively electrically charged particles, these particles being positive or negative ions properly speaking, or electrons.

In preferred embodiments, recourse is further had to one and/or other of the following arrangements:
the ion generator means comprise an electric circuit adapted for generating a high voltage and a discharger disposed at the base of the body, formed of two electrodes fed by said high voltage.
the above high voltage is between 10 and 50 kV,
the ion generator means comprise an explosive cartridge disposed at the base of the body and means for exploding this cartridge,
means are provided for automatically activating the ion generator means for a pre-determined period from the moment when a parameter directly concerned by the grounding to be effected exceeds a pre-determined threshold, said activating means comprising a detector detecting the variations of said parameter, a comparator in which the value of the threshold is registered and receiving the output from the detector and possibly a monostable circuit activated by the output of the comparator,
the above parameter is the static potential difference created between the body and the ground or, which is tantamount to the same thing, the electrostatic field created between these two units,
the above parameter is the intensity of a high frequency electromagnetic wave,
the ion generator means comprise a permanent source of radioactive radiation disposed at the base of the body,
the activity of the radioactive source is between 50 microcuries and 25 millicuries,
the ion generator means comprise a sharp edged or pointed conducting piece projecting from the body.

Apart from these arrangements, the invention comprises certain other arrangements which are preferably used at the same time and which will be more explicitly discussed hereafter.

In what follows, preferred embodiments of the invention will be described with reference to the accompanying drawings in a way which is of course in no wise limitative.

FIG. 1 of these drawings shows very schematically a metal body set on the ground and equipped with a grounding device according to the invention;

Figure 1:
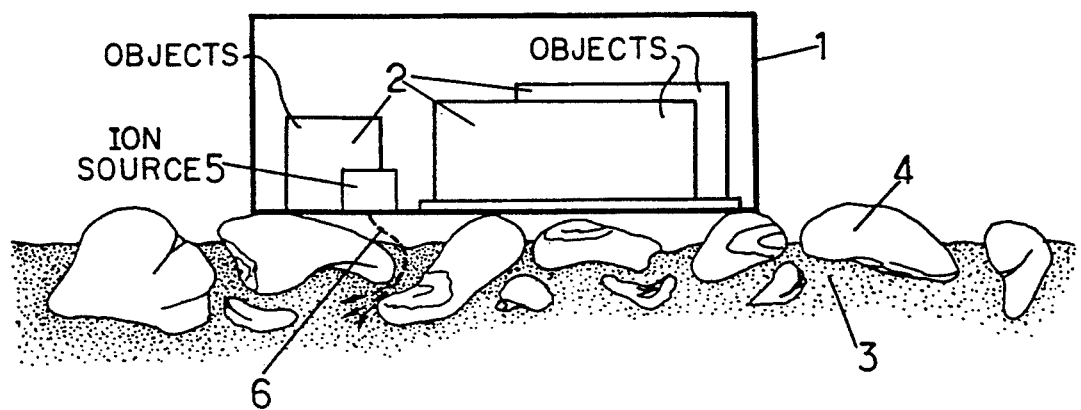

Having a metal body or bodywork 1 containing objects or assemblies 2 of the above defined kind, likely to be disturbed or damaged by defective grounding, it is desirable to ground said body 1 even if it is moving or if, as illustrated, it is set on conducting ground 3 via electrically insulating blocks such as rocks 4.

For this, an ion source 5 is disposed at the base of the body for emitting ions into the electric field generated by the potential difference which possibly exists between the body and the ground, this emission being provided so that said ions are driven by said field in one direction or in the other depending on their polarity and thus create a current of ions 6, which current is capable of passing between the rocks 4 from the base of body 1 to the conducting ground 3: thus, the undesirable electrostatic charges present on the body are automatically compensated for by said ion current 6.

Figure 2:
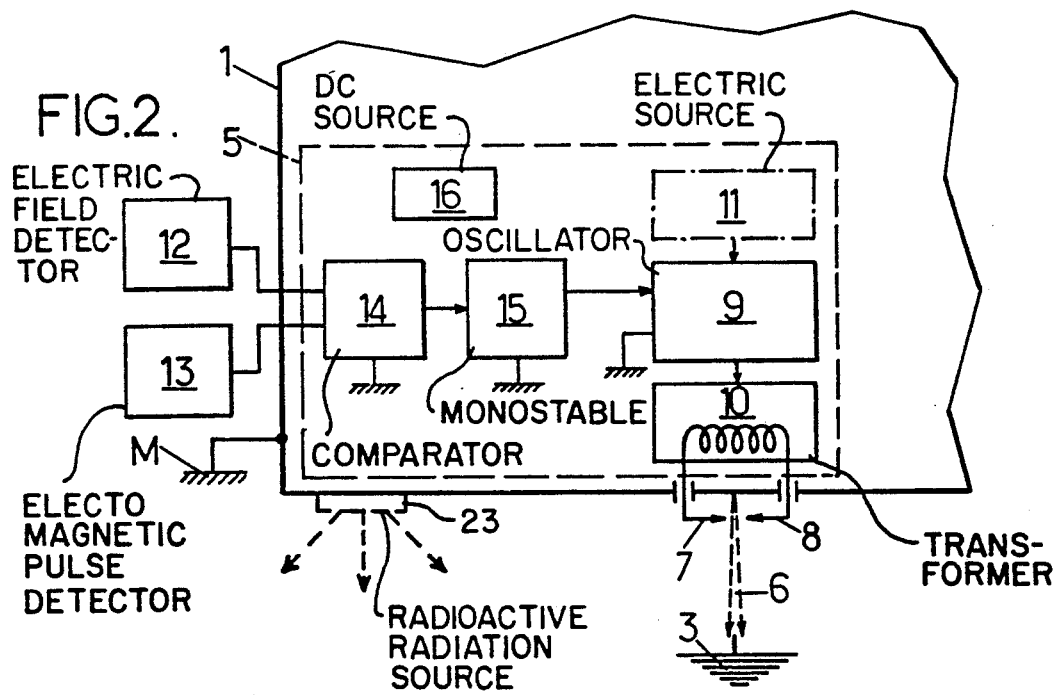
FIG. 2 shows schematically the contents of such a device.

The ions may be permanently, i.e., generated from a radioactive source 23 shown schematically in FIG. 2.

In this case, the support of said source is adapted so that the ions generated thereby are placed in a zone between the body and ground where a high electric field is likely to appear when the potential of the mass of the body and that of ground are not equal, the movement of said ions in said field, due to the very existence of this field, resulting in neutralizing the electric charges carried by the mass of the body.

Such a source is advantageously chosen from those capable of generating alpha (Americium 241) or beta (Caesium) radiations and whose activity is between 50 microcuries and 25 millicuries.

In other embodiments which are illustrated in FIG. 2, the ions 6 are created permanently or only at certain times, by applying to the discharge electrodes 7, 8 of a discharger a high voltage U which may be present in the form of a succession of pulses, the repetition frequency of these pulses being possibly high and for example of the order of 10 kHz to 1 MHz.

This voltage U is generated by an oscillator 9 connected to the discharger 7, 8 via a booster transformer 10.

The value of said voltage U is preferably between 10 and 50 kV.

The oscillator 9 may be permanently activated from an appropriate electric source shown with a chain dotted line at 11.

In a preferred embodiment, more economic in energy, this activity is automatically generated and only in the case of need.

For this, the following are provided:
means 12, 13 for detecting the variations of one of the parameters representative of defective grounding or whose manifestation requires immediate grounding,
a comparator 14 for detecting the overshooting of a pre-determined threshold by such a parameter,
and a monostable circuit 15 for automatically activating the oscillator 9 for a pre-determined period T, which is advantageously about a second, after overshooting of such a threshold.

The parameter in question is for example the static potential difference created between the mass of body 1 and ground 3 or, which is tantamount to the same thing, the electrostatic field H which exists between these two units.

The detector shown schematically by rectangle 12 in FIG. 2 is then provided for detecting such a field H.

The comparator 14 is then adapted so as to trigger the monostable circuit 15 as soon as the detected field H exceeds a pre-determined value, for example about 200 V/cm.

The detected parameter may also be the intensity of a high power and high frequency electromagnetic wave suddenly applied to the body 1 and coming for example from lightning or a high explosion.

The considerable electric voltage pulse resulting from this wave could cause serious damage to the objects or materials 2 if the corresponding energy could not be immediately discharged to ground.

The circuit shown schematically by rectangle 13 in FIG. 2 is adapted so as to detect the intensity of such a wave and comparator 14, so as to instantaneously trigger the emission of the ion current 6 capable of discharging the corresponding energy to ground as soon as it exceeds a critical threshold.

In this respect, it may be advantageous to use the teaching of the French patent application 87 16985 which was filed in the names of the Applicants and according to which, in thundery weather, a discharge ion current is automatically generated in space by a discharger very shortly before the application of lightning to this apparatus, the emission of said ion current being triggered by the electromagnetic wave which accompanies the deflagration giving rise to the lightning and which reaches the level of said apparatus just before the lightning itself.

Rectangle 16 of FIG. 2 schematizes the DC electric source, generally formed by a battery or accumulator, which supplies the device.

But such a source may be omitted: for this, the electric energy captured by the electric field detector 12 or by the electromagnetic pulse detector 13 may be directly used, after rectification and storage in a capacitor, for feeding the comparator circuit 14.

Of course, the "earths" used for the set of above apparatus or circuits 9 to 16—and some of which have been shown symbolically in the usual way—are formed by the mass M of the metal body 1, which mass is possibly connected electrically to one of the electrodes of the discharger 7, 8.

Instead of being generated by a voltage booster electronic circuit itself served by an oscillator, the electric high voltage applied to electrodes 7, 8 of the above discharger could be generated by other means such for example as a piezo-electric device using the mechanical excitation of a ceramic.

To overcome any risk of inflammation of explosive products which may be contained in the metal body 1 to be grounded, the ion generator may be surrounded by a protective screen and associated with a blowing device for driving the ions produced downwards.

Such blowing could be obtained very suddenly by causing the explosion of an explosive capsule close to the ion generator.

Figure 3:
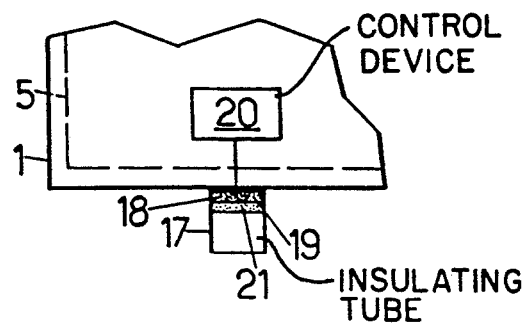
FIG. 3 shows schematically a variant of said device according to the invention.

In a variant shown schematically in FIG. 3, the ion generator is formed by an insulating tube 17 having a conducting bottom 18 in electric connection with the electric mass of body 1. This tube is open downwards or comprises a bottom lid easy to break or release. A detonator 19 placed against bottom 8 and controlled by a device 20 makes it possible to cause the explosion of an explosive element 21 placed in tube 17.

When device 20 is triggered, the explosion produced in the tube causes the creation of an ionized plasma which is driven at high speed towards the ground. This plasma jet establishes the electric connection desired between the mass of body 1 and ground 3.

Device 20 may be formed by the above described means 12 to 14.

Figure 4:
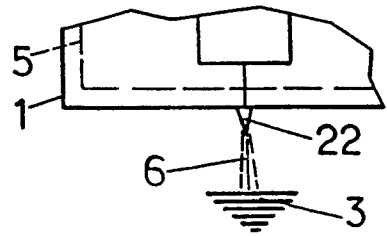
FIG. 4 shows schematically one embodiment according to the invention of one of the components of a device of the above kind.

In all cases, as indicated in FIG. 4, and to reinforce the electric field in which the ions are created, it is advantageous for the ion generator to comprise a sharp edged or pointed conducting piece 22 projecting from body 1, preferably downwards and generally under this body, so as to ensure a concentration of the field lines in the region close to this piece and thus accelerate the movement of the ions in the electric field between the body and ground.

Following which and whatever the embodiment adopted, a device is finally obtained for grounding metal bodies whose construction, operation and advantages are clear from the foregoing.

As is evident, and as it follows moreover already form what has gone before, the invention is in no wise limited to those of its modes of application and embodiments which have been more especially considered: it embraces, on the contrary, all variants thereof.

We claim:

1. Device for grounding a metal vehicle body, said device comprising ion generator means or automatically generating between the body and electrical ground, a stream of ions which, under the effect of an electric field which may exist between the body and electrical ground, are driven towards the body or towards electrical ground depending on the polarity of the ions to create an ionic path between the body and electrical ground and thus equalize the potentials of the body and electrical ground and thereby provide grounding of the body.

2. The device according to claim 1, wherein the ion generator means comprises an electric circuit for generating a high voltage and a discharger disposed at the base of the body and comprising two electrodes fed by said high voltage.

3. The device according to claim 2, wherein the high voltage is between 10 and 50 kV.

4. The device according to claim 1, wherein the ion generator means comprises an explosive cartridge disposed at the base of the body and means for exploding this cartridge.

5. The device according to claim 1, further comprising means for automatically activating the ion generator means for a pre-determined period from the moment when a parameter affected by the grounding of the body to be effected by the ion generator means exceeds a predetermined threshold value, said activating means comprising a detector for detecting variations in said parameter, a comparator for storing the threshold value, for receiving the output from the detector and for comparing the outputs from the detector with said threshold value and a control circuit activated by the output of the comparator.

6. The device according to claim 5, wherein said parameter is the static potential difference created between the body and electrical ground or the electrostatic field created between the body and electrical ground.

7. The device according to claim 5, wherein said parameter is the intensity of a high frequency electromagnetic wave.

8. The device according to claim 1, wherein the ion generator means comprises a permanent source of radioactive radiation disposed at the base of the body.

9. The device according to claim 8, wherein the activity level of the radioactive source is between 50 microcuries and 25 millicuries.

10. The device according to claim 1, wherein the ion generator means includes a sharp edged or pointed conducting piece projecting from the body.

* * * * *